United States Patent [19]

Sun

[11] Patent Number: 5,557,450
[45] Date of Patent: Sep. 17, 1996

[54] OPTICAL ROTATION ENCODER FOR X-Y DIRECTION INPUT DEVICE

[75] Inventor: Jack Sun, Taipei, Taiwan

[73] Assignee: Primax Electronics Ltd., Taipei, Taiwan

[21] Appl. No.: 177,161

[22] Filed: Jan. 4, 1994

[51] Int. Cl.⁶ .................................................. G02B 26/02
[52] U.S. Cl. ........................... 359/234; 250/229; 250/233
[58] Field of Search ................................... 359/227, 230, 359/234–236; 250/232, 233, 231.14, 231.15, 237 G, 231.16, 229

[56] References Cited

U.S. PATENT DOCUMENTS

| | | | |
|---|---|---|---|
| 4,691,101 | 9/1987 | Leonard | 250/231.16 |
| 5,148,020 | 9/1992 | Machida | 250/231.16 |
| 5,155,355 | 10/1992 | Kabaya | 250/237 G |

*Primary Examiner*—James Phan
*Attorney, Agent, or Firm*—Christie, Parker & Hale, LLP

[57] ABSTRACT

An optical rotation encoder for an X-Y direction input device includes a light source for emitting therefrom a light, a pair of substantially vertically aligned light responsive elements for receiving the light, and a circular code wheel mounted between the light source and the light responsive elements, provided thereon plural equiangularly distributed apertures every adjacent two of which have a shielding sectorial area and having a first desired distance with respect to the light source and a second desired distance with respect to the light responsive elements for obtaining an X-Y displacement of the input device by plural pulses resulting from the light which is to be received by the light responsive elements and passes through the apertures to be intermittently projected on the light responsive elements when the circular code wheel is in a rotating motion, wherein the light source is a point light source and either the aperture or shielding sectorial area has a width smaller than a combined width of the pair of substantially vertically aligned light responsive elements. Such optical rotation encoder for an X-Y direction input device can provide thereby a relatively high resulting resolution for a related monitor.

11 Claims, 7 Drawing Sheets 5,557,450

OPTICAL ROTATION ENCODER FOR X-Y DIRECTION INPUT DEVICE

FIELD OF THE INVENTION

The present invention relates generally to an optical rotation encoder for an X-Y direction input device,

BACKGROUND OF THE INVENTION

One of the conventional optical rotation encorders for an X-Y direction input device includes an X-direction photoelectric apparatus and a Y-direction photoelectric apparatus. As shown in FIG. 1, each photoelectric apparatus 1 includes a circular code wheel 11 having plural equiangularly distributed apertures, two light-emitting diodes 12, 13 separately mounted beside one side of the circular code wheel 11, and two light responsive elements 14, 15 separately mounted beside the other side of the circular code wheel 11. Therefore, the light emitted from the light-emitting diodes 12, 13 can pass through the apertures to the light responsive elements 14, 15 when the circular wheel rotates, so the light responsive elements 14, 15 can intermittently receive the light, and then a series of pulse signals are generated. When the input device is translated along a surface, a ball of the input device is contacted against the surface and then rolled, so the code wheel whose shaft contacts against the ball is synchronously rotated and the pulse signals corresponding to the angular movement of the ball in the X-direction and Y-direction and further corresponding to the desired cursor movement on a related monitor are obtained. The chief disadvantage of the aforementioned optical rotation encoder for an X-Y direction input device is that its assembly is relatively complicated owing to the relatively large number of the involved components. Besides, the distances between the light-emitting diodes 12, 13 and the light responsive elements 14, 15 should be carefully considered by a precise calculation in order to ensure an accurate operation of the optical rotation encoder. Referring to FIG. 2, there is another conventional optical rotation encoder for an X-Y direction input device whose photoelectric apparatus 2 includes a circular code wheel 21 having plural equiangularly distributed apertures, a planar light source 23 such as a light-emitting diode mounted beside one side of the circular code wheel 21, and a pair of vertically aligned light responsive elements 25 (e.g., a pair of vertically aligned phototransistors). Its basic principle and operation are similar to those of the previously described optical rotation encoder, but this conventional technique applies a pair of vertical aligned light responsive elements 25 instead of two separately located light-emitting diodes. In addition, the number of the involved components is reduced and the assembly and the installation thereof are relatively easy because of the use of the pair of vertically aligned light responsive elements 25. The pair of vertically aligned light responsive elements 25 can generate "00", "01", "10", and "11" pulse signals, e.g., when both of the pair of vertically aligned light responsive elements 25 are shielded by the code wheel 21 and cannot receive the light emitted from the light source 23, the "00" pulse signal is generated; and when both of the pair of vertically aligned light responsive elements 25 are rightly corresponding to the apertures and can receive the light emitted from the light source 23, the "11" pulse signal is generated. As shown in FIG. 3, if the combined width of the pair of vertically aligned light responsive elements 25 is 2 W, the size of the apertures of the code wheel 21 must be slightly larger than 2 W. Owing to the facts that the resulting resolution for the related monitor is directly affected by the size of the apertures and that the size of the pair of vertically aligned light responsive elements 25 cannot be reduced (i.e., a reduced size of the pair of vertically aligned light responsive elements 25 will result in an erroneous operation of the input device), if the resulting resolution is to be increased, the size of the code wheel 21 should be increased to allow an increase in the number of the apertures. However, the increase in the size of the code wheel 21 will correspondingly increase the size of the X-Y direction input device. Thus, this conventional input device cannot both meet the demands of an increased resulting resolution and a reduced size.

It is therefore attempted by the Applicant to deal with the above situation encountered by the prior art.

SUMMARY OF THE INVENTION

An objective of the present invention is to provide an optical rotation encoder for an X-Y direction input device which can easily obtain thereby a relatively high resulting resolution for a related monitor.

Another objective of the present invention is to provide an optical rotation encoder for an X-Y direction input device applying a point light source.

In accordance with one aspect of the present invention, an optical rotation encoder for an X-Y direction input device includes a light source for emitting therefrom a light, a pair of substantially vertically aligned light responsive elements for receiving the light, and a circular code wheel mounted between the light source and the light responsive elements, provided thereon plural equiangularly distributed apertures every adjacent two of which have a shielding sectorial area and having a first desired distance with respect to the light source and a second desired distance with respect to the light responsive elements for obtaining an X-Y displacement of the input device by plural pulses resulting from the light which is to be received by the light responsive elements and passes through the apertures to be intermittently projected on the light responsive elements when the circular code wheel is in a rotating motion, wherein the improvement is that the light source is a point light source and that either said apertures or said shielding sectorial areas have a width smaller than a combined width of the pair of light responsive elements for easily obtaining thereby a relatively high resulting resolution.

Certainly, the desired distances can be adjustable for easily obtaining thereby a desired resulting resolution by adjusting said desired distances. The point light source can be mounted on a light source seat. The light responsive elements can be mounted on a light responsive element seat. The point light source, the light responsive elements, the light source seat and the light responsive element seat can cooperatively constitute a photoelectric transducer. The point light source can have a convex light emitting surface. The point light source can have a width of no more than 0.3 mm.

Certainly, the input device can further include an integrated control circuit electrically connected to the light responsive elements for controlling the pulse signals.

Certainly, a high and a low logic decision levels for the integrated control circuit can be adjusted for preventing the pulse signals from being distortedly generated.

Certainly, the present input circuit can further include a compensating control circuit electrically connected to the integrated control circuit for preventing the pulse signals from being distortedly generated. The compensating control circuit can include a pull-down resistor.

The present invention can be more fully understood by reference to the following description and accompanying drawings, which form an integral part of this application.

DETAILED DESCRIPTION OF THE PREFERRED EMBODIMENT

Figure 1:
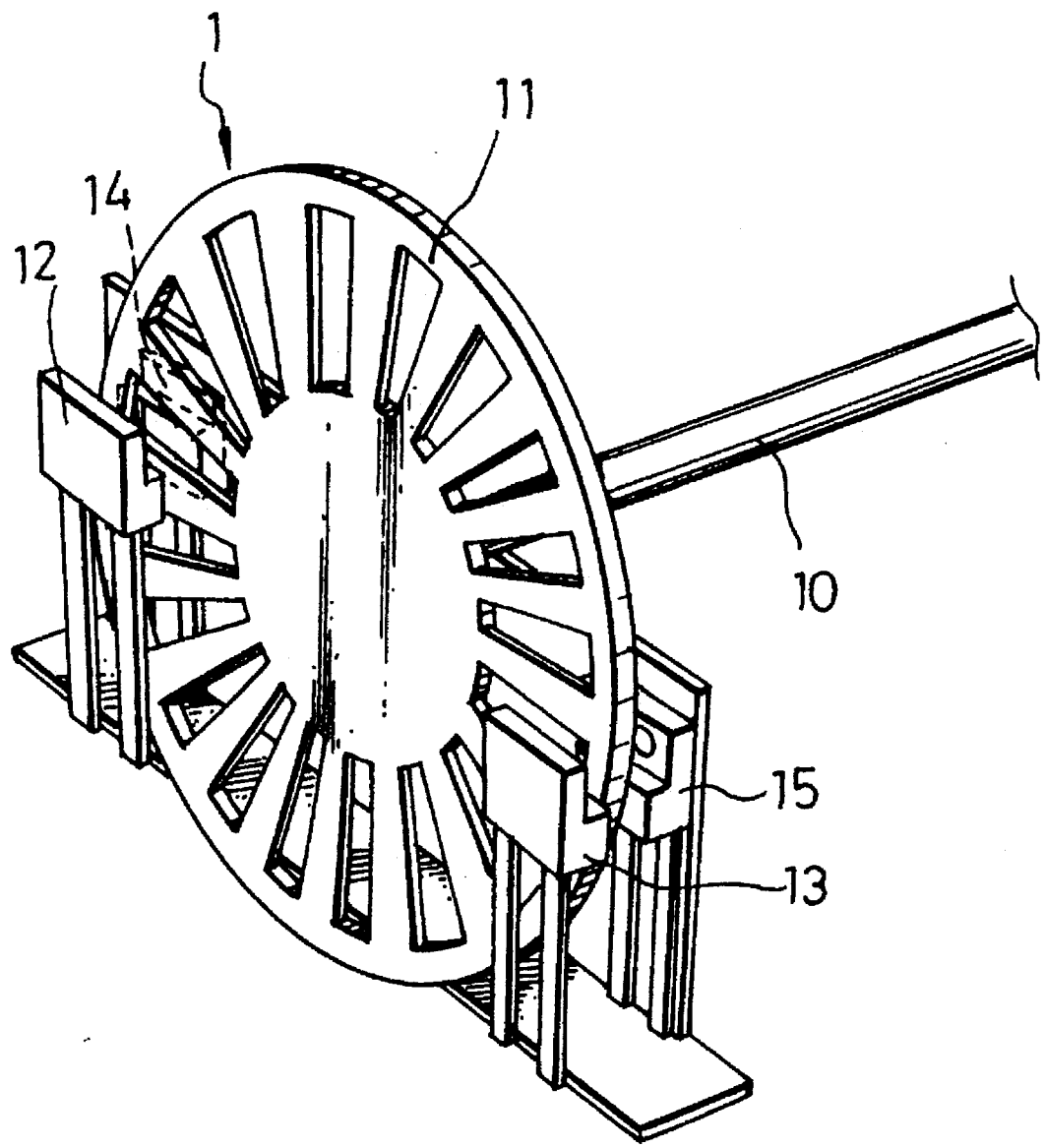
FIG. 1 schematically shows a first conventional optical rotation encoder for an X-Y direction input device.
Figure 2:
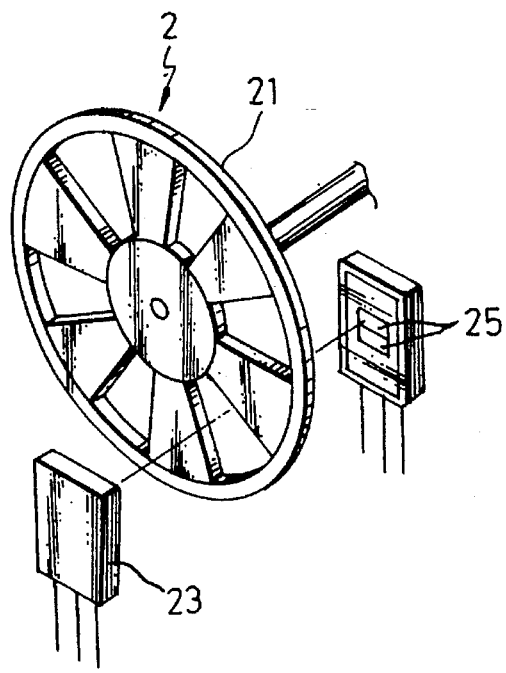
FIG. 2 schematically shows a second conventional optical rotation encoder for an X-Y direction input device.
Figure 3:
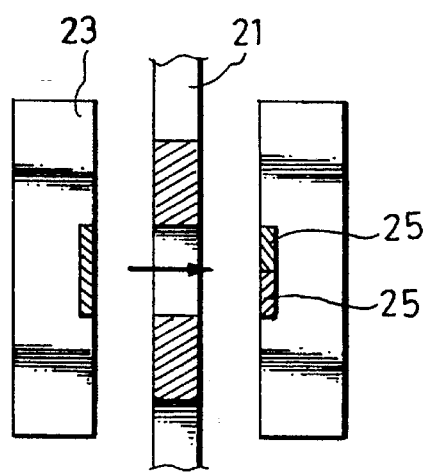
FIG. 3 is a side view showing the operation of the second conventional optical rotation encoder for an X-Y direction input device.
Figure 4:
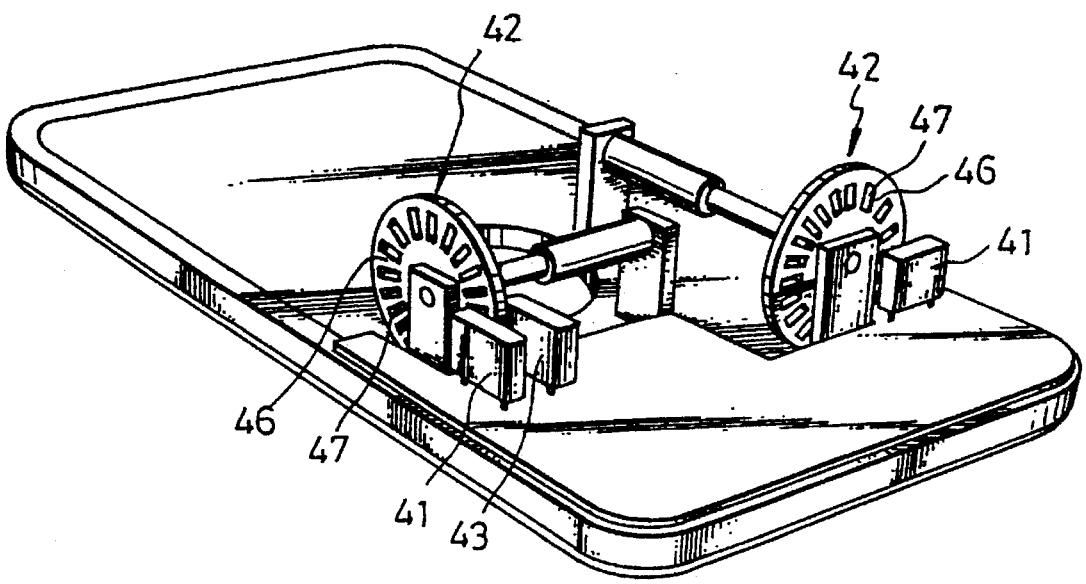
FIG. 4 is a perspective view of a preferred embodiment of an optical rotation encoder for an X-Y direction input device according to the present invention.
Figure 5:
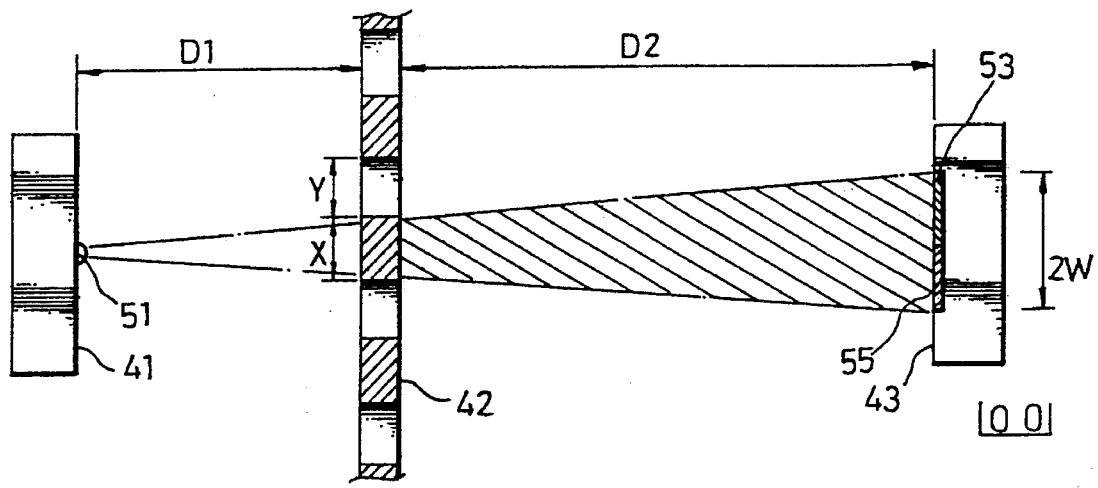
FIGS. 5–8 schematically shows how light responsive elements of an optical rotation encoder for an X-Y direction input device in accordance with the rotation of the code wheel generate the "00", "01", "10", and "11" pulse signals according to the present invention.
Figure 6:
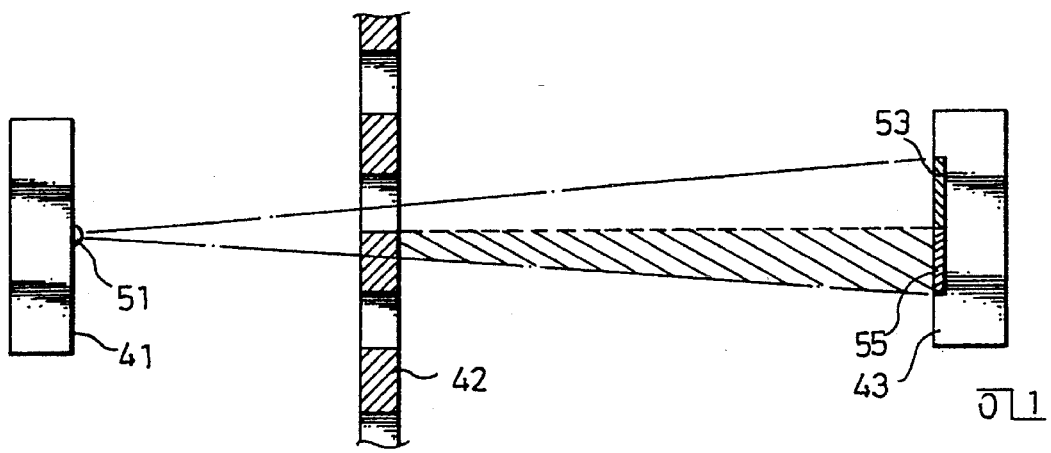
Figure 7:
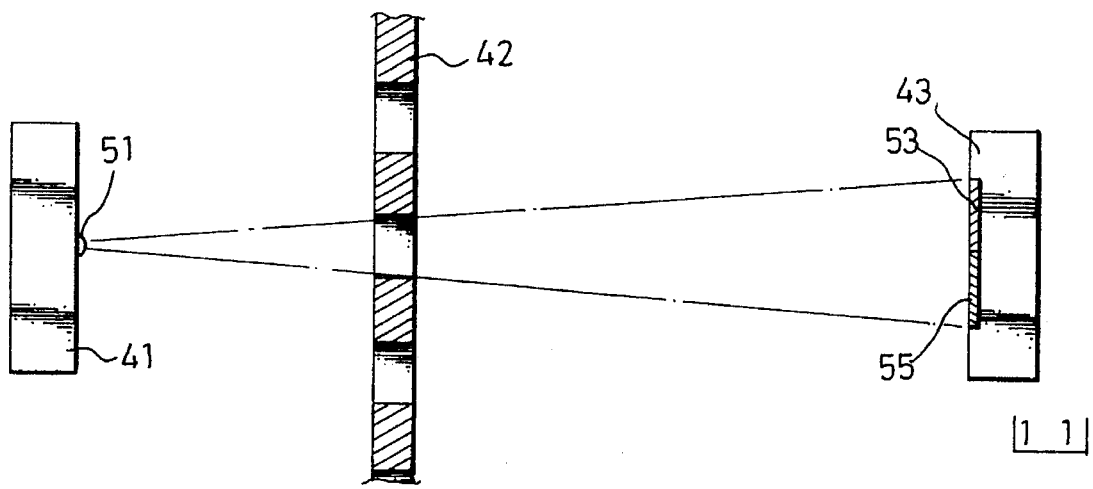
Figure 8:
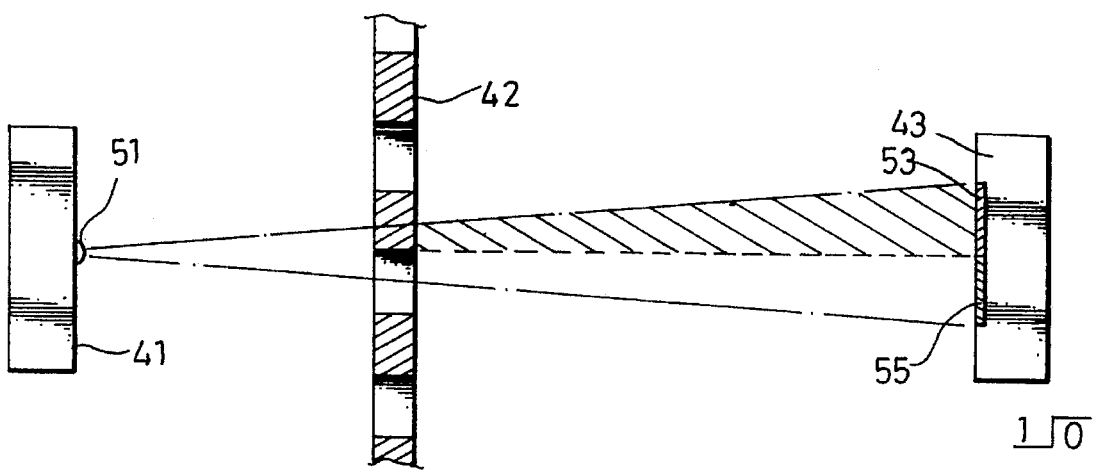

A preferred embodiment of an optical rotation encoder for an X-Y direction input device according to the present invention is depicted in FIGS. 4–8. The present optical rotation encoder for an X-Y direction input device is installed in the input device and includes a photoelectric transducer including a light source 51 for emitting therefrom a light, a light source seat 41 for mounting thereon the point light source 51, a pair of substantially vertically aligned light responsive elements 53, 55 being a pair of substantially vertically aligned phototransistors for receiving the light, and a light responsive element seat 43 for mounting thereon the light responsive elements 53, 55, and a circular code wheel 42 mounted between the point light source 51 and the light responsive elements 53, 55, and provided thereon plural equiangularly distributed apertures 47 every adjacent two of which have a shielding sectorial area 46, wherein said light source 51 is a point light source and either said apertures 47 or shielding sectorial areas 46 have a width Y or X smaller than a combined width of said pair of substantially vertically aligned light responsive elements 53, 55 for easily obtaining thereby a relatively high resulting resolution for a related monitor.

It is to be noticed that the point light source 51 has a convex light emitting surface and a width of no more than 0.3 mm. Referring again to FIG. 5, if the combined width of the light responsive elements 53, 55 is 2 W, the distance between the code wheel 42 and the light source 51 is D1 and the distance between the code wheel 42 and the light responsive elements 53, 55 is D2, the width Y of the apertures 47 will be $(2W * D1)/(D1+D2)$.

Although the combined width of the light responsive elements 53, 55 is fixed, the aperture width Y can be made smaller or larger to accomodate the position of the code wheel 42 between the light source 51 and the light responsive elements 53, 55. The code wheel 42 interrupts intermittently the light emitted from the point light source 51 to the light responsive elements 53, 55, so the pulse signals can be generated when the code wheel 42 rotates.

Figure 9:
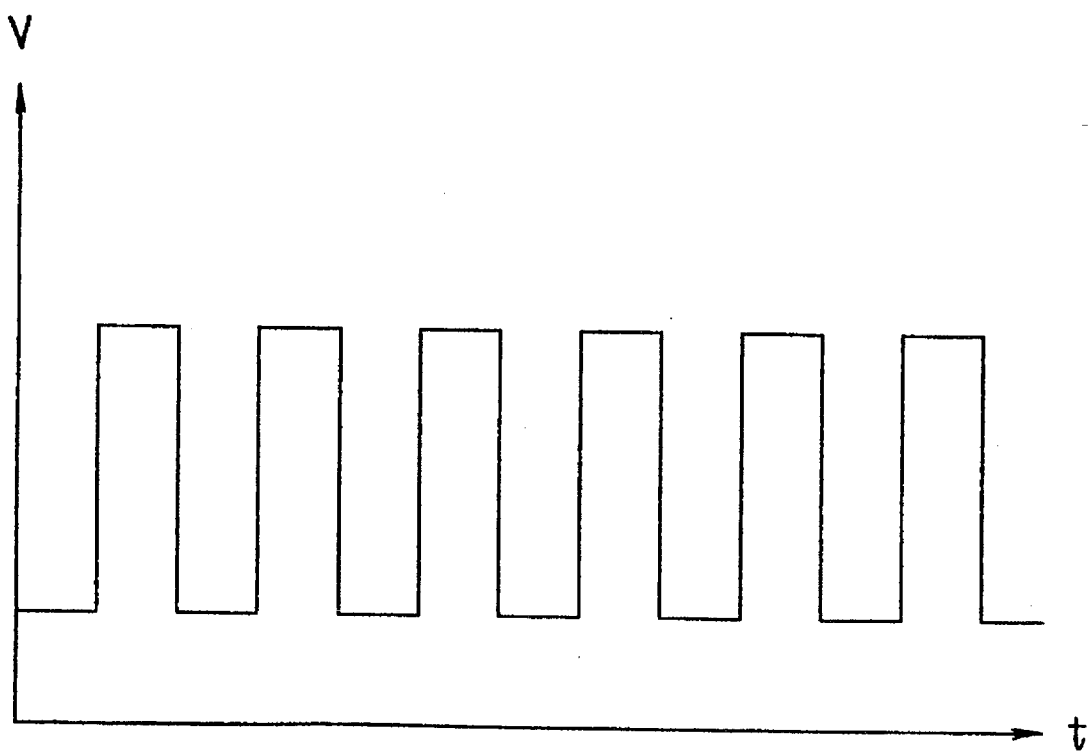
FIG. 9 is a signal diagram showing distorted pulse signals generated by one of the light responsive elements of a preferred embodiment of an optical rotation encoder according to the present invention.

If the distance between the light source 51 and the code wheel 42 cannot be controlled accurately, a leakage of light to the light responsive elements 53, 55 will easily occur, and then the output pulse signals of the light responsive elements 53, 55 are distorted (as shown in FIG. 9). There are two methods to compensate the signal distortion of the output pulse signals, namely:

1) The light responsive elements are electrically connected to an integrated control circuit for controlling the output pulse signals. By only adjusting the high and the low logic decision levels for the integrated control circuit, the output pulse signals which are transmitted into the integrated control circuit can be prevented from being distortedly generated, and therefore the above-mentioned problem can be solved.

Figure 10:
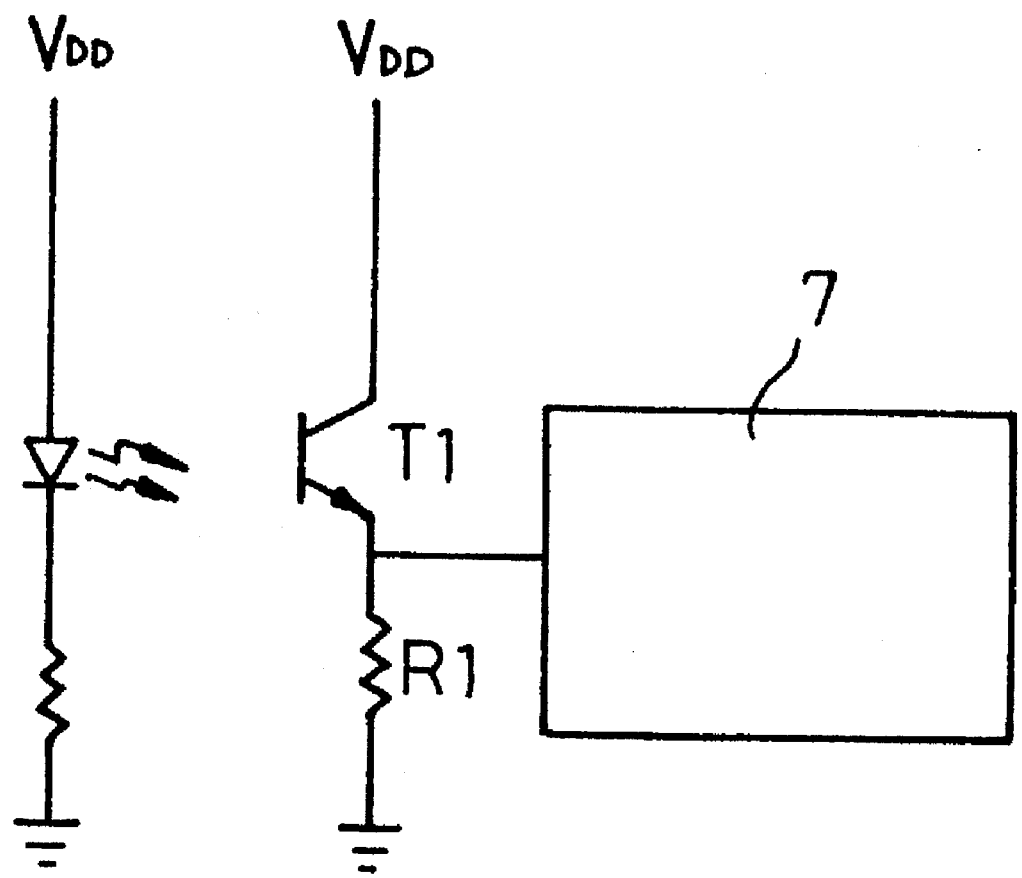
FIG. 10 schematically shows a signal compensation circuit for an optical rotation encoder according to the present invention.

2) As shown in FIG. 10, a signal compensation circuit can be connected to the input pin of an integrated control circuit 7. The signal compensation circuit is a pulldown biasing resistor R1 which serves to adjust the input gate voltage to the integrated control circuit 7.

The present optical rotation encoder for an X-Y direction input device has the following advantages:

A) By adjusting the distance D1 between the code wheel 42 and the light source 51 and the distance D2 between the code wheel 42 and the light responsive elements 53, 55, the number of the apertures 47 can be increased (since $Y=(2W * D1)/(D1+D2)$), and thus the resolution resulting from the present X-Y direction input device incorporating therein the present encoder can correspondingly be increased.

B) The signal distortion of the pulse output of the light responsive elements 53, 55 can be easily compensated by adjusting the high and the low logic decision levels for the integrated control circuit, or by electrically connecting thereto a signal compensation circuit to the input pin of the integrated circuit.

While the present invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims whose scope is to be accorded the broadest interpretation so as to encompass all such modifications and equivalent structures.

What is claimed is:

1. An input device for a monitor, the input device comprising an optical rotation encoder for sensing X-Y movement of the input device, the encoder comprising:

a point light source for emitting therefrom a light;

a pair of light responsive elements aligned for receiving said light; and a circular code wheel mounted between said light source and said light responsive elements and having a plurality of equiangularly distributed apertures, every adjacent two of which have a shielding sectorial area therebetween, wherein an X-Y displacement of said input device causes a plurality of pulse signals to be generated as a result of said light passing through said apertures and being intermittently projected on and received by said light responsive elements when said circular code wheel rotates, said circular code wheel being mounted at a first distance from said light source and a second distance from said light responsive elements with one of said apertures and said shielding sectorial areas having a width smaller than a combined width of said pair of light responsive elements, said width of said one of said apertures and said shielding sectorial areas being a function of said first and second distances thereby allowing a relatively high resulting resolution for the monitor to be easily obtained.

2. An optical rotation encoder according to claim 1 wherein said desired distances are adjustable for easily obtaining thereby a desired resulting resolution by adjusting said desired distances.

3. An optical rotation encoder according to claim 1 wherein said point light source is mounted on a light source seat.

4. An optical rotation encoder according to claim 3 wherein said light responsive elements are mounted on a light responsive element seat.

5. An optical rotation encoder according to claim 4 wherein said point light source, said light responsive elements, said light source seat, said light responsive element seat cooperatively constitute a photoelectric transducer.

6. An optical rotation encoder according to claim 1 wherein said point light source has a convex light emitting surface.

7. An optical rotation encoder according to claim 6 wherein said point light source has a width of no more than 0.3 mm.

8. An optical rotation encoder according to claim 1 further comprising an integrated control circuit electrically connected to said light responsive elements for controlling said pulse signals.

9. An optical rotation encoder according to claim 8 wherein a high and a low logic decision levels for said integrated control circuit are adjusted for preventing said pulse signals from being distortedly generated.

10. An optical rotation encoder according to claim 8, further comprising a compensating control circuit electrically connected to said integrated control circuit for preventing said pulse signals from being distortedly generated.

11. An optical rotation encoder according to claim 10 wherein said compensating control circuit includes a pull-down resistor.

\* \* \* \* \*